Jan. 30, 1962    R. H. PREWITT    3,018,832
AIRCRAFT STRUCTURE

Filed June 30, 1955    9 Sheets-Sheet 1

FIG. 1

INVENTOR
RICHARD H. PREWITT
BY
Sidney W. Frick
ATTORNEY

Jan. 30, 1962   R. H. PREWITT   3,018,832
AIRCRAFT STRUCTURE
Filed June 30, 1955   9 Sheets-Sheet 2

INVENTOR
RICHARD H. PREWITT
BY
Sidney W. Frick
ATTORNEY

FIG. 3

Jan. 30, 1962 R. H. PREWITT 3,018,832
AIRCRAFT STRUCTURE
Filed June 30, 1955 9 Sheets-Sheet 5

FIG.6

INVENTOR
RICHARD H. PREWITT
BY
Sidney W. Frick
ATTORNEY

Jan. 30, 1962 R. H. PREWITT 3,018,832
AIRCRAFT STRUCTURE
Filed June 30, 1955 9 Sheets-Sheet 7

INVENTOR
RICHARD H. PREWITT
BY
Sidney W. Frick
ATTORNEY

Jan. 30, 1962 R. H. PREWITT 3,018,832
AIRCRAFT STRUCTURE
Filed June 30, 1955 9 Sheets-Sheet 8

INVENTOR
RICHARD H. PREWITT
BY
Sidney W. Frick
ATTORNEY

United States Patent Office 3,018,832
Patented Jan. 30, 1962

3,018,832
AIRCRAFT STRUCTURE
Richard H. Prewitt, Wallingford, Pa., assignor to Prewitt Aircraft Company, Clifton Heights, Pa., a corporation of Pennsylvania
Filed June 30, 1955, Ser. No. 519,127
24 Claims. (Cl. 170—159)

This invention relates in general to aircraft structures and more particularly to rotor blades for rotary wing aircraft although it may be utilized as well in fixed wings, flaps, tail surfaces, fins, and other similar surfaces.

Rotor blades and present day high speed aircraft structures are subjected to very high direct and fatigue loads and therefore require special consideration to support these loads without incurring fatigue failures in the materials making up the structures. Furthermore, in the case of a rotor blade and for certain tail surfaces, it is necessary to obtain a chordwise balance at or near the aerodynamic center of pressure which is generally considered to be at or near twenty-five percent of the distance from the leading edge to the trailing edge. For this reason, it is particularly important to keep the weight forward and to maintain the aft structure as light as possible. The advent of adequate adhesive bonding materials, the development of suitable techniques for the bonding of structural materials thereby, and the availability of light weight stiffening materials including the sandwich type utilizing honeycomb or other light filler material and others, have combined to provide the means for creating new and vastly improved structures meeting the foregoing and other requirements more completely, more efficiently, and more simply. The potential so created has not yet been fully realized, and it is a main object of the present invention to progress further toward full realization of this potential with the provision of an improved and superior rotor blade for helicopters or other light weight high strength structure utilizing more fully the aforesaid means.

Another object of the invention is the provision of a structure such as will permit forming thereof to an exact external contour.

A further object of the invention is the provision of a structure having optimum strength to weight ratio and weight distribution corresponding to stress distribution with local strengthening as necessary for the handling and transmission of concentrated loads.

Still a further object of the invention is an improvement in the efficiency of the blade structure in its inboard attachment area and the provision of improved attaching means cooperating therewith.

An additional object of the invention is the provision of a blade incorporating sandwich panel type stiffening and having increased strength at the joints of such panels and where two such panels come together and including means for locally reinforcing such sandwich structure to permit the transfer of concentrated loads, with the sandwich structure being so arranged to permit molding of the blade to exact external contour against an external mold surface with internal pressure bag means.

Other objects of the invention include the provision of a blade capable of carrying internally thereof insulated hot pressurized gases in an efficient manner, the provision of improved means for tip weight control, and the application of an improved aerodynamically shaped tip.

The foregoing and other objects, together with a fuller understanding of the invention and its many advantages, will appear in the following description thereof, referring to the accompanying drawings, in which.

Referring now to the drawings in detail, the embodiment of the invention herein illustrated is a rotor blade 20, having outboard or tip end 20a, inboard or root end 20b, leading edge 20c, and trailing edge 20d. In service this blade will be attached to an external fork (not shown) at the outboard and inboard main retention pin bushings 30 and 31, respectively, for the main forward fitting, and to another external fork (not shown) at the aft retention pin bushing 36 for the aft fitting, said bushings acting as machine fittings for assembling the blade to the forks. These forks will be designed to carry the entire load from the blade consisting of centrifugal forces and bending forces in all planes as well as shear forces to a suitable hub carrying proper rotating bearings to operate in the familiar manner of a rotating wing aircraft. When used as a fixed wing or surface, the fork fittings will be fastened to the main structure of the aircraft as required.

Figure 6:
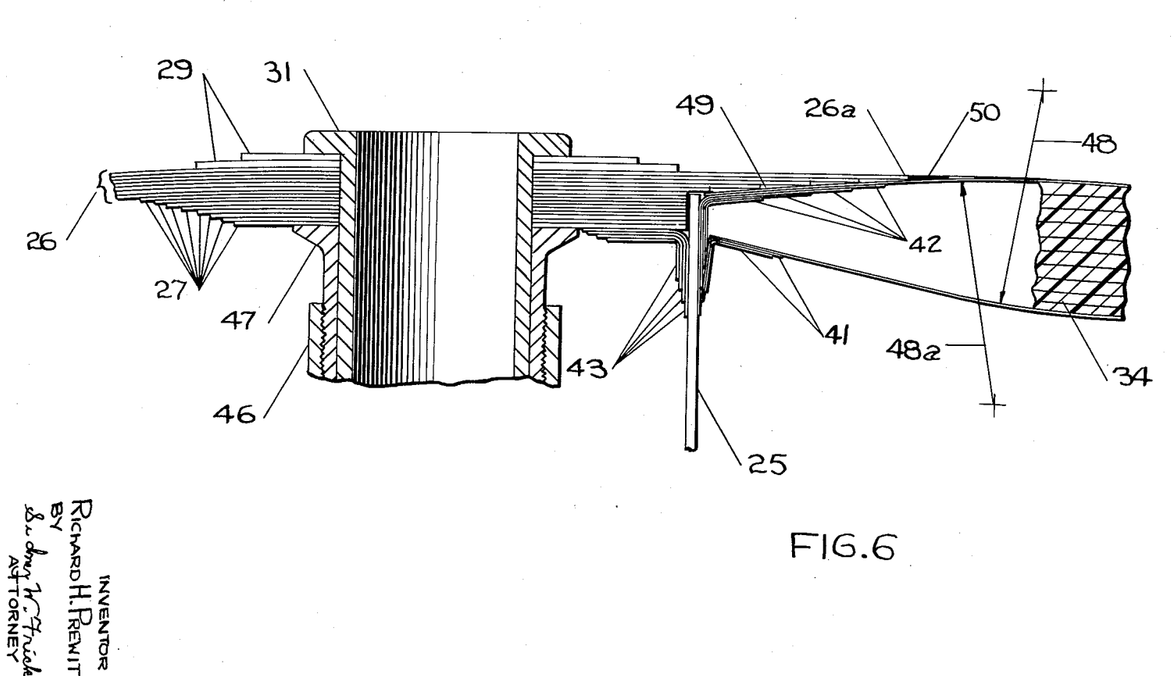
FIGURE 6 shows an enlarged partial chordwise section taken through the main retention pin, and illustrating, inter alia, the joints between the main beam assembly and the aft panel assembly.

In further detail, blade 20 includes a main laminated spar shell 26, shaped to form the nose section of the blade, being of varying thickness as required by load carrying and balance considerations, and built up of layers of thin sheets of metal adhesively bonded together to form an essentially hollow structure, a spar web 25 enclosing said shell, an aft section the external contour of which is shaped and stiffened by upper and lower sandwich panels having fillers 34, 34a, 38, 38a and 45 of varying densities, having inner face sheets 40 and external face sheets forming a part of external metal skin 39 which envelops the whole. The outboard end of the blade is enclosed by tip cover bonded assembly 21 consisting of shell 21a, inner rib 21b, low density filler material 21c, and bolt seats 21d. This assembly 21 is fastened to the blade with longitudinally extending fastening members such as bolts 59 which are suitably threaded and secured into lugs 22a and 24a of front ballast housing 22 and rear ballast housing 24, respectively. I propose to fair above bolts 59 with suitable filler material such as illustrated at 21c, which may also be used as a locking means for bolts 59. Tip assembly 21 is maintained flush with the external skin 39 and spar shell 26 with lips or positioning ledges 60a of high density panel filler 60, illustrated in FIGURE 12. These assemblies are provided as required to give flush mating between the tip assembly 21 and the blade. Ballast weights 57 are assembled with plugs 58 into front and rear ballast housings 22 and 24, respectively, which are bolted to spar shell 26 and to sandwich panel inner face sheets 40, high density panel filler 61, and outer face sheets 39 through bolts 23, as best illustrated in FIGURE 13, and further in FIGURE 1. The inboard end of the blade is enclosed by root end spar cover 32 and root end panel rib cover 33 and 33a, both of which are tightly fitted to prevent "pumping" and the associated power loss. In the root retention pin areas of the blade, most greatly affected by local stresses where the pins pierce the skin, internal doublers 27 and external doublers 28 and 29 comprising additional thin sheets of metal of desired dimensions are bonded to the structure for reinforcement. Rear retention pin contour adapter 35 converts the aft section external contour to provide parallel surfaces facilitating application of rear retention pin bushing 36 and its nut 36a. The forward retention pin bushings 30 and 31 include clamping means well suited for use with this laminated structure, best illustrated in FIGURE 6 where the spar shell 26 laminates and the doublers 27 and 29 are shown held around the drilled holes in the vise provided by the head of bushing 31 and spreader column end 47 thereby overcoming the tendency toward separation between the laminates due to the wedging action of chips and edge roll over during drilling. Bushings 30 and 31 also include means for improving the efficiency of the inboard attachment to the blade whereby the upper and lower external contour surfaces of the blade are expanded into two parallel surfaces at and near the retention fitting. Bushings 30 and 31 together with their respective nuts 30a and 31a put an external compressive force around their respective holes. Internal spreader column ends 47, best shown in FIGURES 2 and 6 for the inboard pin but being the same for the outboard pin, are forced apart and against the area surrounding the holes by spreader column nut 46 acting on right and left hand threads of spreader column ends 47. Alternate means for accomplishing this surface spreading is shown in FIGURE 3. The external pressure applying assembly comprises bushings 30 and 31 and their nuts 30a and 31a, as before, providing combination clamps and fixed bushings. The spreading force is provided by spreader wedges 54 and center wedge 54a for the inboard pin and by spreader wedges 53 and center wedge 53a for the outboard pin. In this case the wedges are forced into place prior to drilling the holes and remain in place during assembly and operation. This latter arrangement facilitates the drilling operation and is less expensive than the machined parts of FIGURE 2. Spar web 25 is bonded to spar shell 26 by means of laminated joint angles 43, as best shown in FIGURE 6. As also shown in this figure and in FIGURES 2 and 7, upper and lower aft section sandwich panels are bonded to the structure at the spar web by means of laminated joint angles 41 at the inner face sheets 40 and laminated joint angles 42 at the outer face sheets which join with outer spar shell laminate at its aft end 26a to form external skin 39. At this joint filler material 50, readily supplied by use of excess adhesive material in the bonding process, provides a smooth contour. The laminations of spar shell 26 may be stepped off aft of web 25, as shown, providing a means of tapering the stiffness at the juncture of the aft panels and the web 25 so that the shear loads from the aft panels can be more readily transmitted into the nose. Panel internal edge filler block 51 is provided at the forward panel edges between angles 41 and 42, permitting the use of hard pressure between these angles in positioning the members in this area of the blade. Wedge shaped panel joiner strip 44, having a selected flexibility characteristic, joins the upper and lower sandwich panels near the trailing edge of the blade and the inner face sheets 40 of the panels converge just aft of panel joiner strip 44 and continue aft along the center line to the trailing edge to form trailing edge reinforcement 40a, and a symmetrical form of construction. Because of the added weight of these members, it is proposed to limit their aft extension according to local requirements. At the inboard end of the blade where heavy compression loads may be acting near the trailing edge of the blade, these aft extending sheets may be very effective whereas outboard they will not be important except to oppose forces tending to separate the upper and lower panels. Stiffening strip 37 is added just forward of reinforcement 40a to simplify the use of certain filler materials which are difficult to feather and to provide local stiffening or strengthening as desired.

In an alternative trailing edge construction, shown in FIGURE 13, the inner face sheet 40 of the upper panel extends aft in parallel with the outer sheet 39 until it reaches the opposite outer sheet 39. At this point the upper panel inner sheet 40 is terminated in end 40b bent to be parallel with the lower panel outer sheet 39. The lower panel inner sheet 40 extends aft only until it reaches the inner sheet 40 of the upper panel just aft of the panel joining strip 44 where it is terminated in end 40b bent to be parallel with the upper panel inner sheet 40. This structure facilitates manufacture although the distribution of whatever forces that may exist in the inner face sheets is not symmetrical. In this alternative construction edge reinforcing strip 62 is sandwiched between the upper and lower panel outer face sheets 39 at the trailing edge of the surface. Stiffening the trailing edge in this manner helps to prevent damage in this area and provides a stiffer member for carrying heavier loads. Still a further alternative trailing edge construction is shown in FIGURE 18. Here the air loads tending to pull the two sections of the airfoil apart are taken primarily through shear connections between the aft ends of the upper and lower sandwich panels and the forward combined face of inner face sheets 69 of supplementary trailing edge upper and lower sandwich panels having outer face sheets integral with skin 39 and low density filler material 72. These shear connections are provided by bending the aft ends of inner face sheets 40 as shown at 71. Inner face sheets 69 are attached directly to skin 39 at 70. Upper and lower surfaces of skin 39 meet at the trailing edge and are adhesively bonded together as illustrated at 73. This structure has the advantage that the loads tending to separate the upper and lower sandwich panels are taken directly in the tension member so provided between the panels, being transmitted to the tension member through the shear connections at the ends of the panels. Another advantage of this system is that fluid pressure can be utilized within the bounds of the inner face sheets 69, thereby avoiding crushing of the honeycomb or other filler material in this area due to excessive thicknesses or lack of pressure on the panel assemblies due to shortage of dimensions.

Further elaboration on features of this invention reflected in the foregoing construction is here desirable and follows in successive paragraphs.

In developing the light aft structure featuring sandwich panels, a number of working considerations have been encountered and solved, two of the items of major importance comprising local curvature of the face sheets 39 and 40 and joins at either end. Reference is here made to the radii indicated in FIGURES 6 and 7, of which 48 is an internal radius of curvature of inner face sheet 40, 48a is an internal radius of curvature of outer face sheet 39, and 48b is an external radius of curvature of inner face sheet 40. When a panel sheet is placed in bending, one of the face sheets is in compression and the other face sheet is in tension. Radii 48 and 48a of FIGURE 6 show a concave curvature to the core of the panel. For this type of curvature, a compression load in the face sheet is curved causes a tension load in the filler material, and, conversely, a reversed radius of curvature as illustrated at 48b of FIGURE 7 effecting a convex curvature to the core of the panel causes compression in the filler material for compression load in the face sheet so curved. Conversely, a tension load in a face sheet causes compression in the filler material for the curvature shown at 48 and 48a and tension in the filler material for the curvature shown at 48b of FIGURE 7. Generally speaking, the filler material will take a greater compression than tension load since the bond between the filler material and the face sheet may not be greatly affected by compression but the bond is directly affected by tension load between the two face sheets 39 and 40. Thus for a given loading in the face sheets and for a given allowable tension or compression, as the case may be, between the face sheets, the radius of curvature 48, 48a or 48b must be greater than some minimum safe value. This has been found to be a very important requirement.

Another consideration of importance is the use of the panel joiner strip 44. This strip is made out of a specific type of material having the characteristics of providing sufficient flexibility between the upper and lower panels, FIGURES 2, 4, 13, and 15, to permit the natural deflection of the panels when acted upon by the air forces tending to separate them. In other words, the part being wedge shaped will provide more deflection in the forward edge than in the aft corner. This wedge shaped deflection provides for a more uniform type loading over the wedge area and thereby permits a reduction in the weight and size of the structure required to carry the separating forces acting on the upper and lower surfaces. The forward edge of panel joiner strip 44 is notch-relieved at its forward surface. This characteristic permits greater deflection here and a low loading in the glue line at the forward edge with a gradual pickup of the glue line loading until it becomes approximately uniform throughout the major portion of the elastic wedge. The total load carried between the upper and lower panels in this manner is illustrated by the vector diagram area shown at 63 in FIGURE 14.

Figure 2:
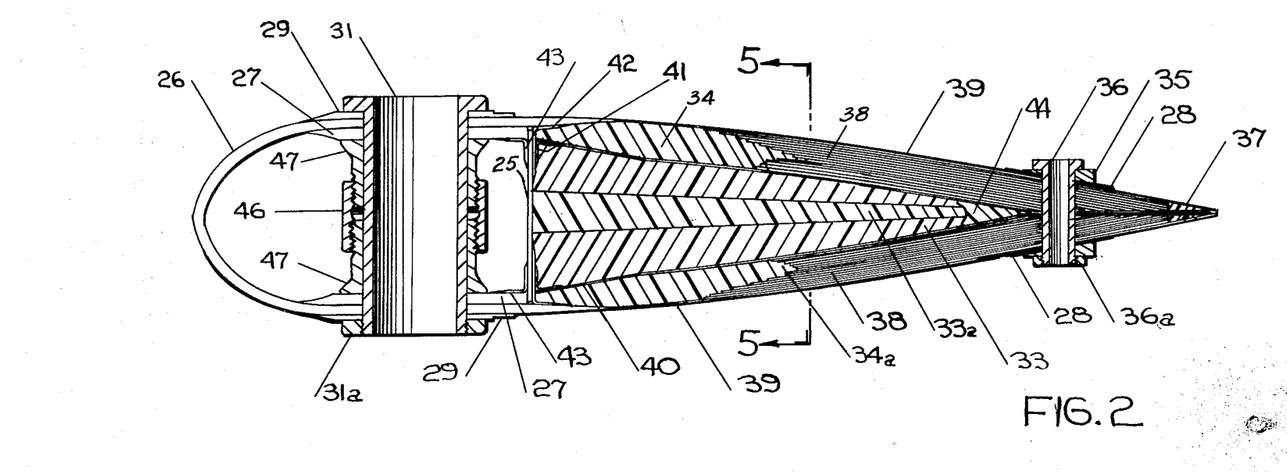
FIGURE 2 shows a cross-sectional view taken along line 2—2 of FIGURE 1, through the inboard retention pin area, and illustrates, inter alia, expansion of the blade material into two parallel surfaces at and near the forward retention pin area.
Figure 3:
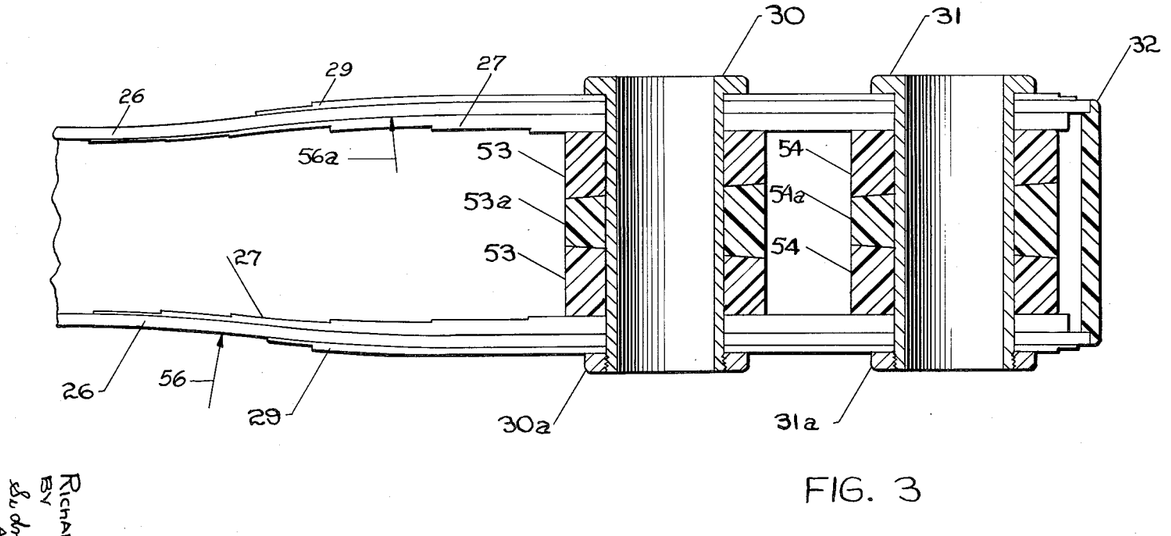
FIGURE 3 shows a longitudinal elevation section view taken along line 3—3 of FIGURE 1, through the forward retention pins in the expanded area.
Figure 5:
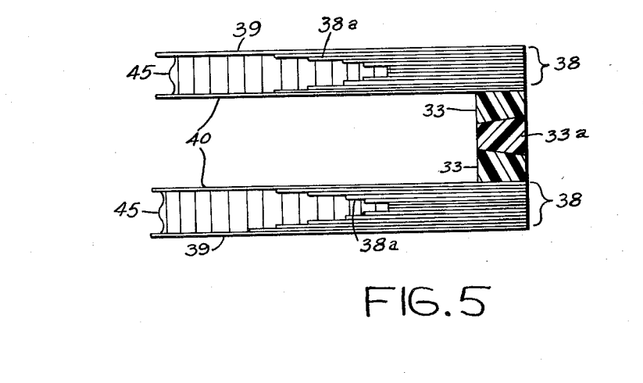
FIGURE 5 shows a longitudinal section taken between the forward and aft retention pins along line 5—5 of FIGURE 1.
Figure 12:
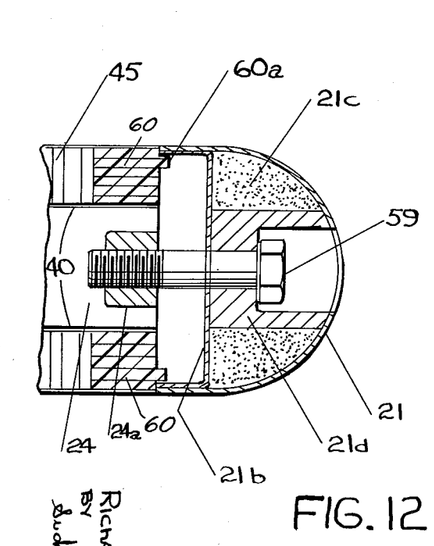
FIGURE 12 shows a longitudinal section view through a tip retention bolt taken along line 12—12 of FIGURE 11.
Figure 13:
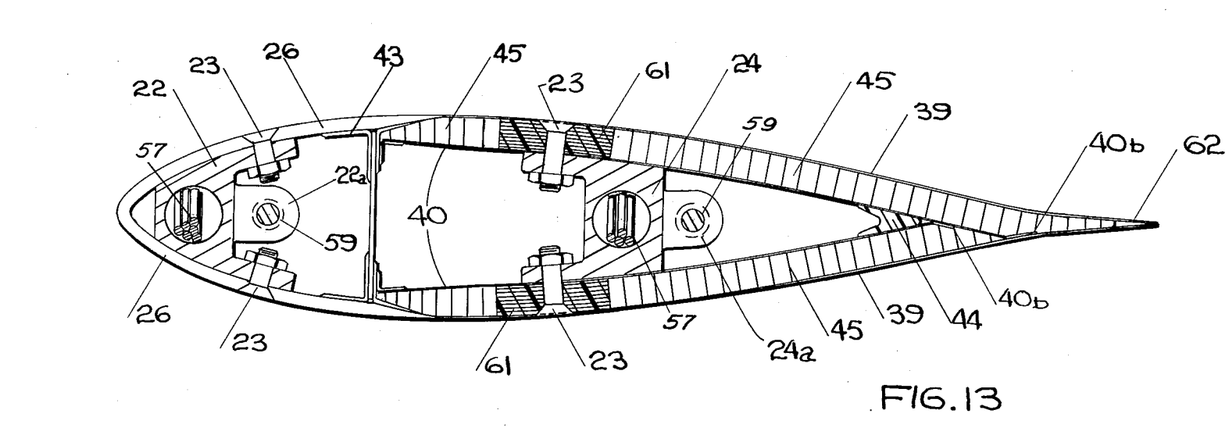
FIGURE 13 shows a chordwise section view taken along line 13—13 of FIGURE 11, and illustrating ballast housing, tip retention lugs, etc.; this view also further illustrates the modified trailing edge structure of FIGURE 11.
Figures 14, 18:
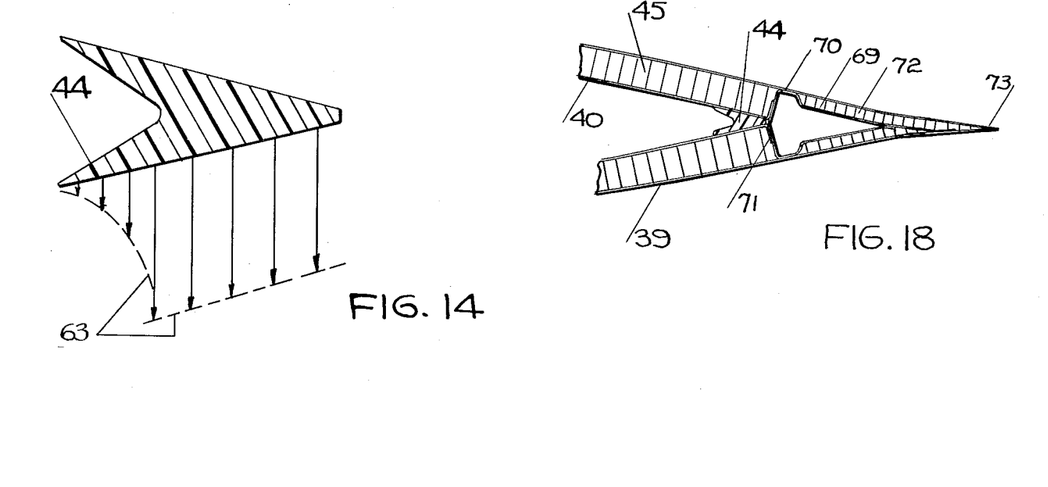
FIGURE 14 shows a force diagram of the spreading forces acting between the two panels in the aft part of the blade structure.
FIGURE 18 shows a partial chordwise cross-section of the blade, illustrating a further modification in the trailing edge region.

Another important part of this invention is the local use of doublers or high density panel fillers, which may be in the form of laminates, within panels along with the means of dissipating the loads from these local areas, such as fitting attachments, into the main face sheets of the panels as illustrated at 34 and 38 of FIGURE 2, at 38 of FIGURE 5, at 60 of FIGURE 12, and at 61 of FIGURE 13. In FIGURES 2 and 5 these high density laminates are shown differentially extending into the low density filler material between the face sheets for varying distances in stepped relationship, and specifically for progressively lesser distances as the center of the sandwich type structure is approached, thereby enabling substantial shear jointing between the severally presenting parallel facing portions of the laminates and the filler material. In this manner, the local strength at a bolt or pin attachment can be tremendously increased with the least amount of additional weight and with the best distribution of forces back into the face sheets. This feature is also employed wherever local stiffening or strengthening is required. For instance, the root end of the blade is subjected to chordwise fatigue loads between the forward main connections at bushing 31 and the trailing edge connection at bushing 36, see FIGURE 2. Considering the front bushing fixed then the loads will be acting in the plane of the paper at bushing 36. The object is to locally reinforce the structure by internal doublers or other high density filler material and/or external doublers 28. The laminates at 38 may be lapped with similar laminates around pin bushing 31 as illustrated at 26 or 27 by using the same type laminates for the filler material 34. The laminates may be step spliced as partially illustrated at 34a of FIGURE 2 and 38a of FIGURE 5. In this manner, the loads from the pin extending through bushing 36 are transmitted into face sheets 39 and 40 and into laminates 38 and filler material 33 and 34 forward and into spar shell laminations 26 just aft of web 25 where the spar shell laminations 26 taper off. It is proposed to use doublers under skin 39 and/or tapered filler laminates, as illustrated at 34a of FIGURE 2, and 38a of FIGURE 5, to provide adequate structure.

Figure 8:
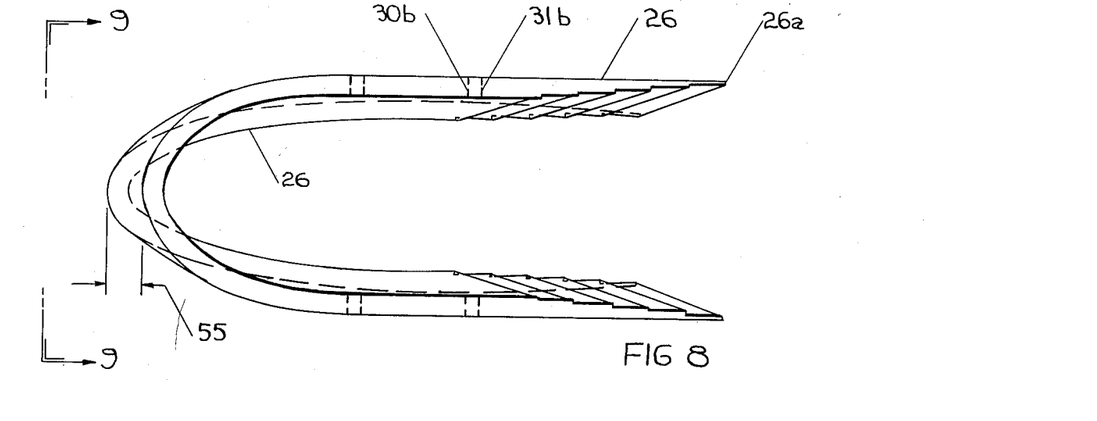
FIGURE 8 shows an end view of the main beam shell illustrating the expanded root end in relation to a typical outboard section.
Figure 9:
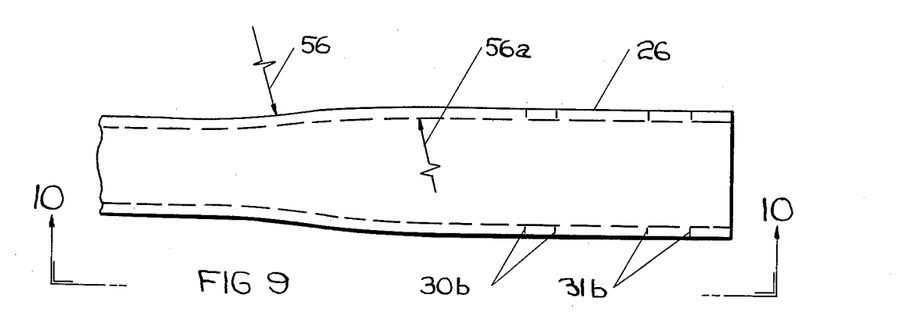
FIGURE 9 shows a front elevation longitudinal section view of the main beam shell at the root end.

The details at the inboard fittings, particularly the means for expanding the spar shell 26 so as to provide parallel extended faces, are important parts of the invention. This permits an easier assembly of machine fittings to properly support and retain the laminated sheets of shell 26 and the doublers 27 and 29. In addition the parallel faces facilitate drilling the major fitting holes. In expanding the inboard end of the main beam spar shell 26 and blade, it is proposed to accomplish this by forcing the sheets out against a properly formed external mold with internal fluid pressure. This structure is appreciably more efficient for transferring the loads as it spreads the upper and lower panels so that they can carry greater bending loads without increased stress. Conversely, it reduces the stresses in these members at the connection where stresses would normally be greater. FIGURE 8 provides a comparison of the root end of the blade expanded as above in relation to a typical outboard section. Note the shortening effect of this expansion as illustrated by offset 55 in FIGURES 8 and 10. Progressive change in section moving outboard as a result of this inboard expansion is shown in FIGURES 3 and 9. The external and internal radii of curvature 56 and 56a in the transition area are shown to illustrate the importance of maintaining these changes in section of the main structural spar shell 26 and its reinforcing appendages internal and external doublers 27 and 29 within tolerable limits. The structure illustrated in FIGURES 3, 8 and 9 is subjected to bending moments and centrifugal forces in the plane of the paper. The centrifugal forces tend to straighten the illustrated radii or make them larger. The bending moments tend to act in the same manner as the centrifugal forces on the tension side of the couple and in a reverse manner on the compression side. This invention accounts for these forces by the stiffness and resistance to bending in the chord plane. In addition I propose to use a bonded filler material as necessary to make rigid and strengthen the member in this area.

Figure 4:
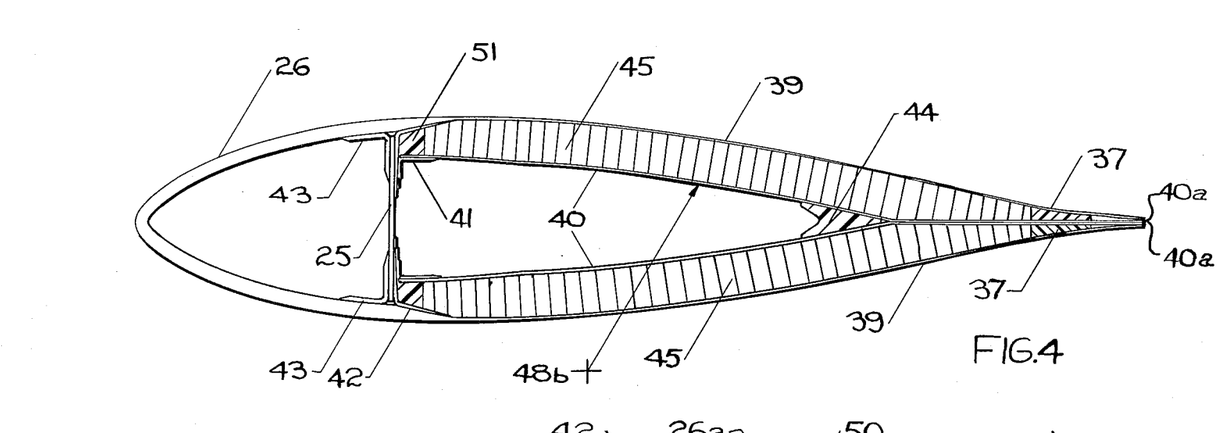
FIGURE 4 shows a typical section chordwise through the airfoil shape structure, taken along line 4—4 of FIGURE 1.
Figure 10:
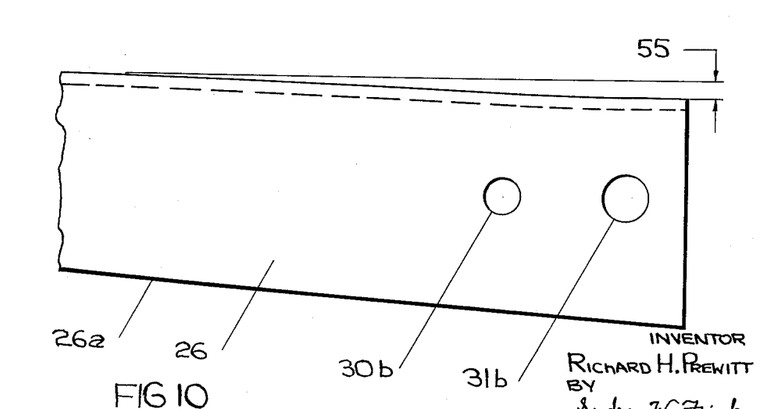
FIGURE 10 shows a plan longitudinal section view of the main beam shell taken in the direction indicated by line 10—10 of FIGURE 9, and illustrating the divergence of the nose from a straight line.

Fuller appreciation of the significance of the structural aspects of the expanded inboard end feature of this invention may be gained from careful consideration of FIGURES 2, 3, 4, 8, 9, and 10 in the light of the following comments. Essentially the blade may be regarded as being divided spanwise by imaginary chordwise vertical planes or cuts into three adjoining longitudinal segments or portions, which for convenience may be referred to as inboard longitudinal portion, transition longitudinal portion, and outboard longitudinal portion, respectively. FIGURE 2 shows a typical chordwise cross-sectional view of the inboard longitudinal portion, FIGURE 4 shows a typical chordwise cross-sectional view of the outboard longitudinal portion, and FIGURE 8 shows in outline an end view of spar shell 26 showing chordwise shapes of the inboard and outboard longitudinal portions in comparison with each other as joined by the transition longitudinal portion. FIGURES 1, 3, 9, and 10 are longitudinal views showing the extent and form of the transition longitudinal portion in its spanwise setting between and manner of joining the inboard and outboard longitudinal portions, the transition longitudinal portion thus comprising that portion of the blade within which the cross-section shape changes from that of the outboard longitudinal portion shown in FIGURE 4 to that of the inboard longitudinal portion shown in FIGURE 2. It is seen that the spar shell 26 has a generally semi-elliptical cross-section shape in the outboard longitudinal portion of the blade and an expanded cross-section shape in the inboard longitudinal portion approaching a semi-circle and two parallel sides, this expanded shape resulting from gradual progessive increase in the minor or vertical axis dimension of the outboard semi-elliptical shape moving inboard through the transition longitudinal portion to the inboard longitudinal portion, with consequent progressive decrease in the major or chord-wise axis dimension of such semi-elliptical shape and resulting offset 55 as shown in FIGURES 8 and 10. This transition in cross-sectional shapes is accomplished while maintaining substantially unchanged the peripheral dimensions of these cross-sections and the thicknesses of the several thin sheets of metal comprising the structure of the spar shell 26, in the process of manufacturing the blade by molding the thin sheets to the exact selected external contour against an external mold surface with internal fluid pressure means, as earlier referred to herein. This method of forming basically involves bending of the sheets, or deformation thereof in planes normal to the planes of the sheets themselves, without appreciable stretching or compression or deformation of the sheets in the planes of the sheets (except to the minimum amount caused by deflecting the sheets in bending), thereby avoiding the undesirable stress patterns and magnitudes consequent upon in-plane deformation, and achieving a structure of much improved strength and reliability.

Figure 7:
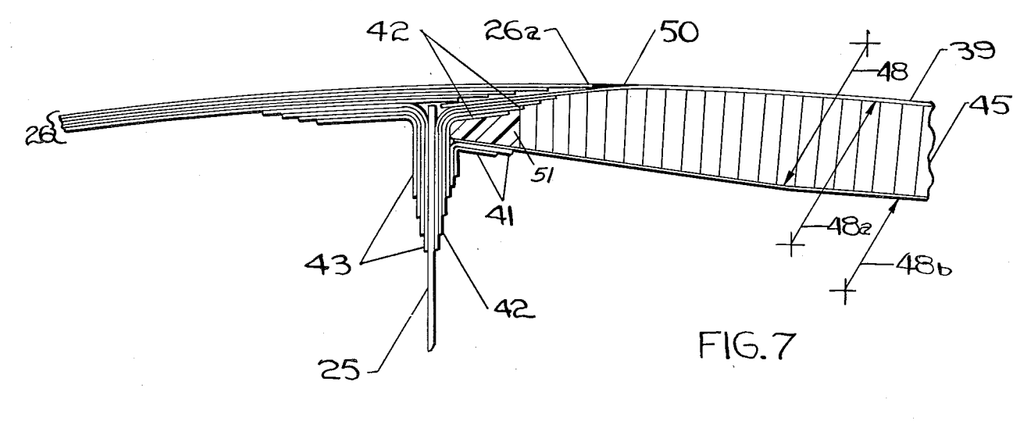
FIGURE 7 shows an enlarged partial typical chordwise section further illustrating the joints between the main beam assembly and the aft panel assembly.

It may be noted that the sandwich panels tend to narrow just aft of the web 25. This is illustrated in FIGURES 2, 4, 6, 7, 13 and 15. There are several sound reasons for providing this type structure. The large shear load existing in this area is reduced in the filler material and partially taken as tension and compression in the unparallel face sheets. Most filler materials have poor allowable compressive loading laterally. In manufacture, this causes difficulty in pressurizing areas to the side of filler material. This difficulty is removed is this invention through tapering the panel face sheets to a blunt apex at the web, as best illustrated in FIGURE 7. In this structure the angles 42 are pressurized during manufacture except for a small area near the angle bend.

The filler material 50, illustrated in FIGURE 7, may be provided in the molding process by supplying excess bonding material between the outer face sheet 39 and outer nose lamination sheet at 26a. When the pressure is applied on the bonding material where the sheets are supported by an external hard mold, the excess bonding material squeezes out into the otherwise voided area. This same phenomena may be made to improve the structure internally where the spar shell laminations are stepped off aft of the web outside of angles 42. An excess of adhesive or other filler material is required in connection with suitable pressures.

Figure 11:
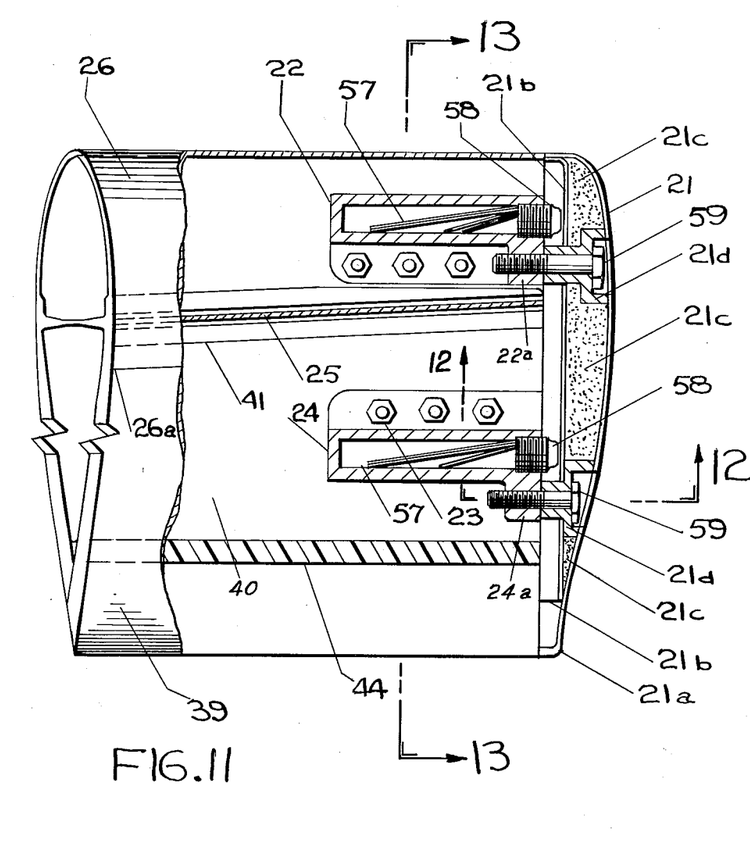
FIGURE 11 shows a plan section view of the tip area of the blade, illustrating, inter alia, the ballast installation for dynamic and static balance provisions; this view also incorporates a modified trailing edge structure alternative to the preferred structure best shown in FIGURE 4.

Experience has shown that air flow about the tip of a rotor blade is important and that any protuberances or flow irregularities may disrupt the flow in a manner to cause lateral stick forces. The combination of rotational velocity at the tip of a rotor blade with the translational velocity causes a diagonal flow inboard from the tip when the blade is forward and away from the blade when the blade is an aft position. From this it may be seen that flow discontinuity at the blade tip may cause different forces to be locally exerted on the blade when the blade is forward or aft. The rotor blade of this invention is specifically supplied with a flush type tip 21 carefully curvilinearly shaped to create least disturbance. The assemblies illustrated in FIGURE 12 in combination with the rigidity and accuracy of the tip assembly 21 provide flush registry between the tip and blade. Ballast weights 57, shown in FIGURE 11, are spread in a chordwise direction to provide for dynamic chordwise balance as well as longitudinal balance. The longitudinal static balance about a point opposite the axis of rotation has the same distribution of moments as the centrifugal forces when the blade is turning about the hub in flight, and therefore a given weight added to the aperture of either ballast housing 22 or ballast housing 24 will satisfy the conditions. It is also of prime importance to balance rotor blades chordwise. In this case the static balance of the chordwise mass about the pitch axis (not shown), which is substantially parallel to the blade, is entirely different from distribution of these forces when acted upon by centrifugal tension. For this reason, it is difficult to satisfactorily balance blades chordwise except by whirl tests or flight tests. The chordwise disposed ballast housings 22 and 24 permit shifting from one position to another without disturbing the longitudinal balance. This is achieved by two things. First, the supports provided by plugs 58 are the same distance from the axis of rotation, and secondly, I propose to split up ballast weights 57 into rods or bars or segments of rods so that the outboard end of weight member rests against the plug 58. In this manner the center of gravity of the tip weight shifted from one of the ballast housings to the other will not change relative to the center of rotation for the blade position in normal flight.

Figure 15:
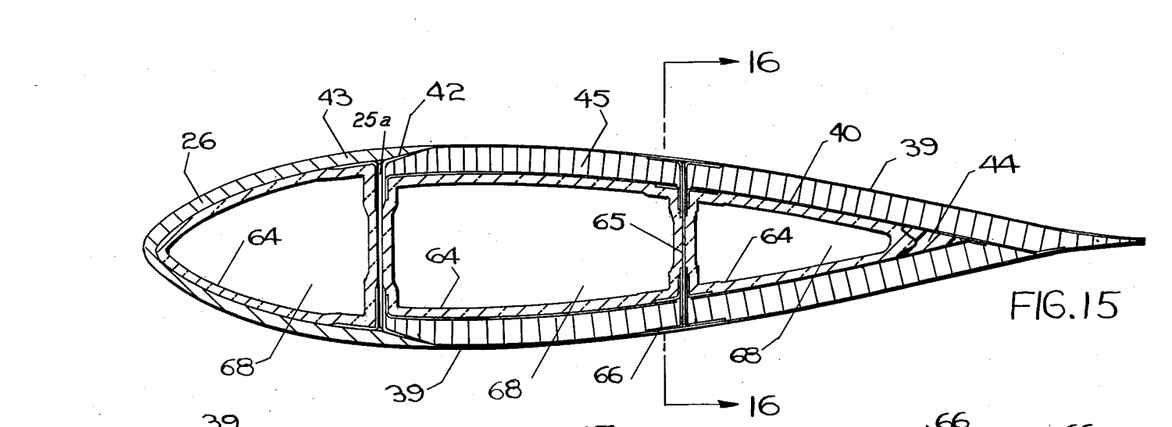
FIGURE 15 shows a view similar to that of FIGURE 4, but illustrating a modification of the structure providing for the transmission of hot gases under pressure internally thereof.
Figure 16:
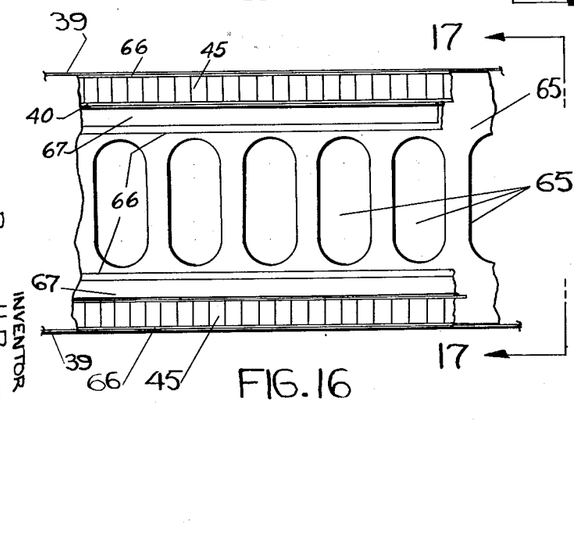
FIGURE 16 shows a simplified longitudinal elevation section, taken along line 16—16 of FIGURE 15, and illustrating the auxiliary web member thereof.
Figure 17:
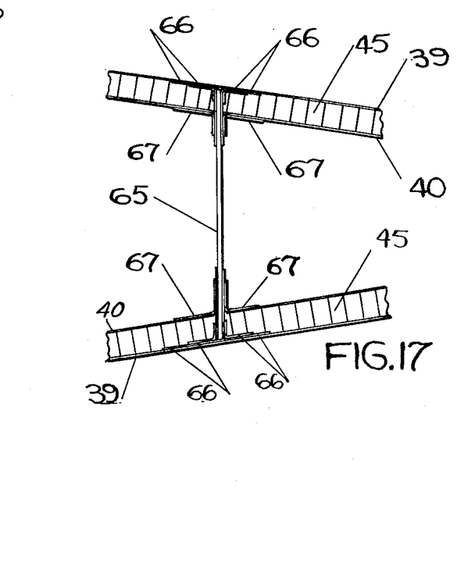
FIGURE 17 shows a simplified cross-section view, taken in the direction of line 17—17 of FIGURE 16, and further illustrating the auxiliary web area of the modification of FIGURE 15.

A further important part of this invention is the system shown in FIGURES 15 and 16 for transmitting hot pressurized gases through the forward and aft parts of the structure. In the use of jet propelled rotor blades, it is important to retain the heat energy within the gas as it is transmitted from the power plant or blower to the tip of the blade, as any heat losses cause a contraction of the gases thereby reducing the pressure or velocity or jet area, any one of which tends to reduce the efficiency of the jet propelled blade. It is proposed herein to reduce the length of the panels of the aft structure so as to permit them to carry the higher pressure loads without increased dimensions and to insulate the adhesive bonded area from the hot gases so that the adhesives will be operating at tolerable limits. This is accomplished by the use of the internal liner 64 which may be made of materials such as glass cloth attached to the internal walls of the blade. Webs 65 and 25a are perforated with apertures 65a to reduce heat absorption. This greatly reduces the absorption of heat from the passage ducts 68 to the webs 65 and 25a. However, the heat that is transmitted into the web is transmitted directly outboard to the joint angles 66 for web 65 and to angles 42 and 43 for web 25a. These angles transmit the heat to a point adjacent to the skin and thereby radiate the heat from the web members. The heat along the other parts of the blade is of less serious consequence and is more readily accounted for. I propose also to consider carrying the web member by a non-conductor material so as to further reduce the requirements for cooling this area.

Figure 1:
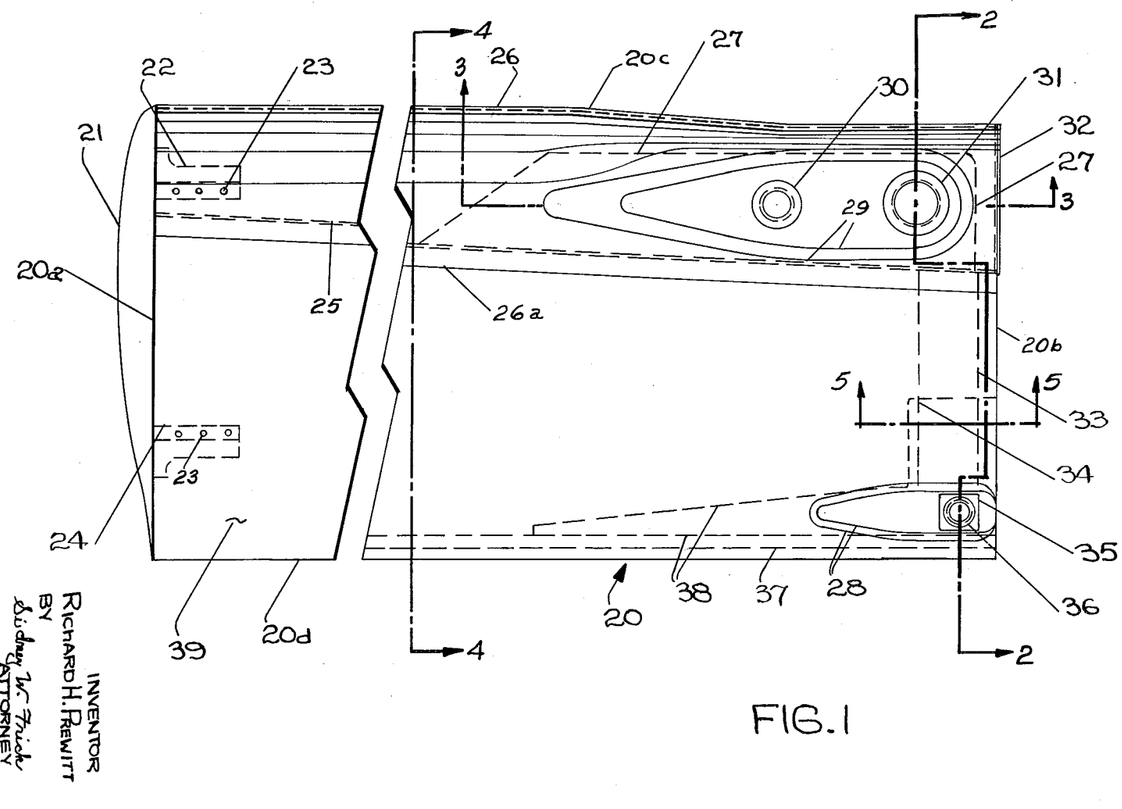
FIGURE 1 shows a plan view of the rotor blade structure of this invention.

External doublers are illustrated in FIGURE 1 at 28 and 29 and internal doublers are illustrated at 27 and 28. The internal doublers are applied during the basic assembly, and with special cavities provided in the molds the external doublers may also be applied during the basic assembly. Other methods for applying the external doublers are: (a) assemble the doublers with cold setting cements; (b) make rigid the original structure to prevent any motion, repressurize the original adhesive bonds, reheat and hot cure external doublers onto structure. I have successfully accomplished hot cures of external doublers by filling the first cured structure with cement in which steam heat pipes are provided. When the basic structure is up to a moderate temperature, the external doublers applied with intense local heat. In this manner the main blade structure never gets to excessive temperatures for the cured cement except locally where the doublers are being joined and in this area the laminates are being held together.

It may now be more fully appreciated that an improved structure for rotor blades and other surfaces has been provided, combining superior efficiency, simple construction, and great flexibility and adaptability for meeting varying application requirements, utilizing laminated and sandwich type adhesively bonded construction means. Although I have described my invention with a certain degree of particularity, it is to be understood that the present disclosure has been made only by way of example and that numerous changes in the details of construction and the combination and arrangement of parts, as well as many variations, modifications and adaptations thereof, may be resorted to without departing from the spirit and the scope of the invention as herein described and claimed.

Having thus described my invention, I claim:

1. A rotor blade having a substantially hollow nose section comprising a laminated spar shell shaped to form the forward external contour of the blade and made up of a plurality of layers of thin sheets of material and adhesive bonding material therebetween, a vertical spar web enclosing the aft portion of said spar shell and joint angles and adhesive material bonding said web to said shell, the outer layer of said thin sheets of materials comprising part of the external skin of the blade and extending aft of the web, successive inner layers of said thin sheets of material extending progressively lesser distances aft of the web to form a tapered structure having tapered stiffness, a substantially hollow aft section having upper and lower sandwich type panels with inner and outer face sheets and relatively low density filler material therebetween, said outer face sheets comprising the balance of the external skin of the blade, the forward portion of said panels being tapered to reduce the distance between the outer and inner face sheets and to match the said tapered structure of the nose section forming in contact therewith a smooth external contour, and joint angles and adhesive material bonding the outer and inner faces of the panels to the spar web.

2. The rotor blade of claim 1 having its nose section generally airfoil shaped and deformed at the inboard end so that said airfoil shape gradually emerges to a shape comprising substantially a semi-circle and two parallel sides, holes extending through said inboard end and retention fittings including bushings extending through said holes, said bushings being flared at one end and threaded at the other end, nuts engaging said threaded ends, pairs of spreader column ends fitting over said bushings internally of the blade and having respectively left and right hand threaded portions, and right and left hand threaded nut members engaging said threaded portions of said spreader column ends.

3. The rotor blade of claim 2 having a tip cover assembly, high density panel filler material near the tip of the blade having extending lips to position the tip cover assembly for flush external contour mating with the blade, ballast housings incorporated internally of the blade near the tip and ballast weights enclosed in said housings.

4. The rotor blade of claim 3 having the outer face sheets of said sandwich panels extend aft to the trailing edge of the blade, the inner face sheets of the panels meeting to form a juncture forward of the trailing edge and extending aft together to the trailing edge, a moderately flexible wedge member attached to the inner faces of said inner face sheets at and forward of their juncture, and a stiffening strip between the inner and outer face sheets of the panels near the trailing edge.

5. The rotor blade of claim 4 having external and internal doublers affixed about the holes in the inboard end of the nose section and local reinforcement areas between the face sheets of the sandwich panels consisting of laminated layers of relatively dense material.

6. The rotor blade of claim 5 having insulating material between the interior of said blade and the inwardly exposed part of the structure, and having the web composed of a material having relatively low heat conductivity.

7. In an airfoil structure, upper and lower sandwich panels each having an inner and outer face sheet, the inner face sheet of one of said panels extending aft until it meets the outer face sheet of the other of said panels and thence deflected and extending parallel thereto and adhesively bonded thereto to provide a shear connection and the inner face sheet of the last-mentioned panel extending aft until it meets the other inner face sheet and thence deflected and extending parallel thereto and adhesively bonded thereto to provide a shear connection.

8. In a sandwich type structure comprising relatively dense load carrying face members and relatively light shear force carrying filler material between said face members, local reinforcement areas between said face members consisting of a plurality of laminates of relatively dense material, the laminates severally extending into the said filler material progressively lesser distances as the center of the sandwich type structure is approached so as to severally present parallel facing portions to said filler material, said filler material surrounding and being adhesively bonded to said severally presenting parallel facing portions of said laminates to provides shear jointing therewith.

9. A sandwich type structure having relatively dense face sheets and relatively light core material between and adhesively bonded to said sheets, and laminations of relatively heavy material replacing said core material in a local area between said sheets, said laminations differentially extending varying distances between the sheets into the core material in stepped relationship, said core material surrounding and being adhesively bonded to said laminations to provide shear jointing therewith, said laminations differentially extending varying distances away from said core material in stepped relationship, and an adjoining structure having laminations of relatively heavy material differentially extending in stepped relationship matching and overlapped with and adhesively bonded to the laminations of the said sandwich type structure to provide shear jointing therewith and carry a load from one of said structures to the other.

10. A hollow structure havng a hole extending therethrough and a retention fitting including a bushing extending through said hole, said bushing being flared at one end and threaded at the other end and having a nut engaging said threaded end to provide an external compressive force, a pair of spreader column ends fitting over said bushing internally of said structure and having respectively left and right hand threaded portions facing toward each other, and a right and left hand nut member engaging said threaded portions of said spreader column ends to provide an internal expansive force opposing said external compressive force.

11. A hollow structure having a hole extending therethrough and a retention fitting including a bushing extending through said hole, said bushing being flared at one end and threaded at the other end and having a nut engaging said threaded end to provide an external compressive force, a pair of spreader wedges and a center wedge therebetween surrounding said bushing internally of said structure to provide an internal expansive force opposing said external compressive force.

12. In an airfoil type structure having an external skin, upper and lower sandwich panels having inner and outer face sheets, the outer face sheet of each panel being integral with the skin and extending to the trailing edge of the structure, the inner face sheets of the panels terminating forward of the trailing edge and having their aft ends bent toward their respective outer face sheets, supplementary trailing edge upper and lower sandwich panels having inner and outer face sheets and being positioned between the trailing edge of the structure and the aft ends of the inner face sheets of the first mentioned upper and lower sandwich panels, the outer face sheets of said supplementary upper and lower sandwich panels being integral with the skin, the forward ends of the inner face sheets of said supplementary upper and lower sandwich panels being arranged to complete an interior cavity and to make contact with their respective outer face sheets, being adhesively bonded thereto, and to make a forwardly disposed combined face, the bent aft ends of the inner face sheets of the first mentioned sandwich panels being adhesively bonded to said forwardly disposed combined face to form shear connections therewith.

13. In an airfoil type generally hollow structure, upper and lower sandwich type panels having inner and outer face sheets and a light core material in each panel between and adhesively bonded to said sheets, inserts in each panel comprising laminated layers of material added locally between said sheets, said layers of material being stacked one over the other and adjacent ones of said layers adhesively bonded to each other and extending different distances between said sheets into the core material in stepped relationship with each other, said core material surrounding and being adhesively bonded to said laminations to provide shear jointing therewith, the two outer ones of said layers of laminations being respectively adhesively bonded to the inner and outer face sheets.

14. In an airfoil type structure having a relatively heavy substantially hollow nose section and a relatively light substantially hollow aft section incorporating upper and lower sandwich panels each of which has inner and outer face sheets and relatively low density filler material therebetween, a vertical web member internally of said nose section and forward of said aft section, joint angles adhesively bonding said inner and outer face sheets of each panel at its forward edge to the web, said relatively low density filler material terminating short of the forward edge of each panel, and a joint strengthening filler block having a density substantially greater than that of said relatively low density filler material filling the space so provided between said sheets forward of said relatively low density filler material at the forward edge of the panel and being adhesively bonded to said face sheets and joint angles and relatively low density filler material.

15. In an airfoil type structure having a relatively heavy substantially hollow nose section and a relatively light substantially hollow aft section incorporating upper and lower sandwich panels each of which has inner and outer face sheets and relatively low density filler material therebetween, a vertical web member internally of said nose section and forward of said aft section, the inner face sheets of said sandwich panels being deflected away from each other toward the external contour of the structure in the forward portions of the sandwich panels to provide tapered thickness thereof, and joint angles adhesively bonding the forward portions of the sandwich panels to the web member.

16. In a rotor blade a plurality of ballast housings located near the tip of the blade and a plurality of elongated ballast weight members of selected individual weights and adapted for positioning internally of said housings, said housings being positioned chordwise of the blade so that any desired chordwise balance of the blade can be achieved without affecting the longitudinal balance of the blade by selectively dividing said ballast weight members between said housings.

17. A rotor blade having tip cover positioning ledges extending outwardly from the outboard end thereof, a tip cover adapted for mating with said ledges, and fastening members extending longitudinally of the blade holding said tip cover in firm registry with said ledges to provide a smooth flush external contour between the tip cover and the blade.

18. In an airfoil structure a relatively heavy hollow nose section and a relatively light hollow aft section having upper and lower sandwich type panels with inner and outer face sheets and a light core material between said sheets, a vertical web extending longitudinally of the structure forward of said aft section and joint angles attaching said web to said inner and outer face sheets, a supplementary vertical web extending longitudinally of the structure dividing said aft section into separate compartments, said supplementary web extending through said sandwich panels to their outer face sheets and joint angles attaching said supplementary web to said inner and outer face sheets, said supplementary web having a plurality of apertures therein, and internal insulating liners covering the inwardly disposed surfaces of said aft section separate compartments.

19. In an airfoil structure a relatively heavy hollow nose section and a relatively light hollow aft section having upper and lower sandwich type panels with inner and outer face sheets and a light core material between said sheets, vertical webs extending longitudinally of the structure internally dividing said nose section and said aft section into separate compartments and internally sub-dividing said aft section into smaller compartments, said webs extending to the outer face sheets of said panels, joint angles attaching said webs to the outer face sheets of said panels, and internal insulating liners covering the inwardly disposed surfaces of the several compartments so formed.

20. A rotor blade having a relatively heavy hollow generally semi-elliptical shaped laminated nose section made up of a plurality of layers of thin sheets of metal adhesively bonded together, said nose section being flared at the inboard end so that said semi-elliptical shape emerges gradually to a shape comprising substantially a semi-circle and two parallel sides, a relatively light hollow aft section having upper and lower sandwich type panels with inner and outer face sheets, a vertical web extending longitudinally of the structure dividing said nose section and said aft section into separate compartments, joint angles attaching said web to said nose section and said inner and outer face sheets of the aft section panels, and internal insulating liners covering the inwardly disposed surfaces of the separate compartments.

21. In an airfoil structure, a relatively light substantially hollow aft section incorporating upper and lower sandwich type panels having inner and outer face sheets and a light core material in each panel between said sheets, and a relatively heavy substantially hollow nose section comprising a laminated spar shell shaped to form the forward external contour of the airfoil and made up of a plurality of layers of thin sheets of material each layer of which extends aft lesser distances than the next adjoining outer layer to provide a tapering of the stiffness of the structure and tapered joints with the aft section, the forward ends of said upper and lower panels being oppositely tapered to mate with the spar shell.

22. In an airfoil type structure having upper and lower external contour defining sandwich panels with inner and outer face sheets and a light core material therebetween, supplementary trailing edge upper and lower external contour defining sandwich panels with inner and outer face sheets and a light core material therebetween positioned aft of said first mentioned upper and lower sandwich panels, the forward ends of the inner face sheets of said supplementary trailing edge upper and lower sandwich panels being bent to form a forward vertically disposed combined face tension member, the aft ends of the inner face sheets of the first mentioned upper and lower sandwich panels being bent and bonded to said tension member to form shear connections between the aft ends of such upper and lower sandwich panels and said forward combined face of the inner face sheets of said supplementary trailing edge upper and lower sandwich panels.

23. A hollow structure having a hole extending therethrough and a retention fitting including a bushing assembly extending through said hole, and a pair of spreader wedges and a center wedge therebetween surrounding said bushing assembly internally of said structure to provide an internal expansive force.

24. In an airfoil structure a relatively heavy hollow nose section and a relatively light hollow aft section having upper and lower sandwich type panels with inner and outer face sheets and a light core material between said sheets, vertical webs extending longitudinally of the structure internally dividing said nose section and said aft section into separate compartments and internally subdividing said aft section into smaller compartments, said webs extending to the outer face sheets of said panels, and joint angles attaching said webs to the outer face sheets of said panels.

References Cited in the file of this patent

UNITED STATES PATENTS

| | | |
|---|---|---|
| 1,763,218 | Caldwell | June 10, 1930 |
| 1,883,672 | Foster | Oct. 18, 1932 |
| 2,211,071 | Moss | Aug. 13, 1940 |
| 2,231,888 | Couch | Feb. 18, 1941 |
| 2,362,301 | Pecker | Nov. 7, 1944 |
| 2,376,653 | Boyer | May 22, 1945 |
| 2,414,125 | Rheinfrank | Jan. 14, 1947 |
| 2,445,290 | Gonda | July 13, 1948 |
| 2,460,351 | Hoffman et al. | Feb. 1, 1949 |
| 2,470,128 | Barrick et al. | May 17, 1949 |
| 2,503,450 | Nebesar | Apr. 11, 1950 |
| 2,514,525 | Stulen | July 11, 1950 |
| 2,522,100 | Diller | Sept. 12, 1950 |
| 2,588,570 | Pitcairn | Mar. 11, 1952 |
| 2,589,193 | Mayne | Mar. 11, 1952 |
| 2,620,884 | Gluhareff | Dec. 9, 1952 |
| 2,631,678 | Enos | Mar. 17, 1953 |
| 2,644,537 | Meyers | July 7, 1953 |
| 2,655,459 | Gordon | Oct. 13, 1953 |
| 2,674,327 | Pullin et al. | Apr. 6, 1954 |
| 2,694,458 | Stevens | Nov. 16, 1954 |
| 2,734,586 | Wright et al. | Feb. 14, 1956 |

FOREIGN PATENTS

| | | |
|---|---|---|
| 1,003,515 | France | Nov. 21, 1951 |